United States Patent [19]
Lalikos et al.

[11] Patent Number: 4,712,642
[45] Date of Patent: Dec. 15, 1987

[54] SELF-DAMPING CONVOLUTED CONDUIT

[75] Inventors: James M. Lalikos, Springfield; Harold K. Waite, East Longmeadow, both of Mass.

[73] Assignee: Titeflex Corporation, Springfield, Mass.

[21] Appl. No.: 828,767

[22] Filed: Feb. 11, 1986

[51] Int. Cl.$^4$ .............................................. F16F 7/00
[52] U.S. Cl. .................................. 181/207; 138/121; 138/122; 138/173; 60/322
[58] Field of Search ............... 138/121, 122, 173, 178; 181/207, 227; 333/239; 60/320, 322

[56] References Cited

U.S. PATENT DOCUMENTS

| | | | |
|---|---|---|---|
| 1,095,100 | 4/1914 | Fulton | 138/121 X |
| 1,424,057 | 7/1922 | Witzenmann | 138/122 |
| 1,459,487 | 6/1923 | Witzenmann | 138/121 |
| 2,274,519 | 2/1942 | Barrett . | |
| 2,489,277 | 11/1949 | Faralla | 138/121 X |
| 2,622,623 | 12/1952 | Michaudet | 138/122 |
| 2,623,121 | 12/1952 | Loveridge | 333/239 |
| 2,770,313 | 11/1956 | Johnson | 181/227 |
| 2,823,702 | 2/1958 | November | 138/121 |
| 2,890,723 | 6/1959 | Evert | 138/122 |
| 3,061,039 | 10/1962 | Peters | 138/121 X |
| 3,104,733 | 9/1963 | Ludlow | 181/227 |
| 3,133,612 | 5/1964 | Sailler | 181/227 |
| 3,176,790 | 4/1965 | Lentz | 181/227 |
| 3,212,603 | 10/1965 | Walker | 181/250 |
| 3,234,969 | 2/1966 | DuMont | 138/121 |
| 3,794,080 | 2/1974 | Huston et al. | 138/121 |
| 3,913,623 | 10/1975 | Siegwart | 138/122 |
| 4,091,892 | 5/1978 | Hehmann et al. | 181/286 |
| 4,315,558 | 2/1982 | Katayama | 138/121 |
| 4,410,013 | 10/1983 | Sasaki et al. | 138/149 |
| 4,413,657 | 11/1983 | Sasaki et al. | 181/227 |

FOREIGN PATENT DOCUMENTS

| | | | |
|---|---|---|---|
| 208589 | 12/1956 | Australia | 333/239 |
| 742529 | 12/1955 | United Kingdom | 181/227 |

*Primary Examiner*—James E. Bryant, III
*Attorney, Agent, or Firm*—Louis Bernat

[57] ABSTRACT

A conduit is adapted for use in an environment where it is subjected to excessive vibration. An example of such an environment is the exhaust system on an engine. To preclude material fatigue responsive to such vibration, successive convolutions are varied in height, thickness, slope, spacing, or a combination thereof. Hence, each incremental length of the conduit has a different resonant frequency as compared to the resonance frequency of its adjacent neighboring incremental lengths so that there is no overall high amplitude resonance along the entire length of the conduit, taken as a whole. On the other hand, once the resonance is sufficient to provide self-damping, efforts should be made to maximize the uniformity of vibration response so that bending forces will not be concentrated in one area of the conduit.

10 Claims, 7 Drawing Figures

SELF-DAMPING CONVOLUTED CONDUIT

This invention relates to convoluted and flexible pipes, hoses, conduits, and the like, suitable for use in hostile environments which impose a high fatigue responsive to flexure, shock, vibration and the like.

The term "conduit" is generically used herein to refer to almost any kind of device for conducting a fluid, without regard to whether it might be more appropriate to call it a hose, pipe, tube, duct, or the like.

The conduit problems outlined below may be illustrated by making a reference to an automotive exhaust system (such as the conduit between an engine exhaust manifold and a catalytic converter). However, the invention is not limited thereto. For example, steam lines, hot air lines, and gaseous fuel lines have many similar problems. Therefore, this reference to automotive exhaust systems is not to be taken as necessarily limiting the invention thereto. Nor, is it limited to high temperatures or gaseous media. Reference is made to U.S. Pat. No. 4,315,558 and references cited therein for a use of a convoluted conduit in an automobile exhaust system.

An automobile exhaust system is an example of a hostile environment which might use the invention. The exhaust is very hot and filled with corrosive gas under pressure. There are substantial vibrations, both rhythemic (such as vibrations caused by the regular rotation and the related harmonics of the engine) and random (such as might be caused by the vehicle striking flying rocks and chuck holes). If a small crack occurs in the conduit, the exhaust gas is forced out by the internal pressure and the resulting corrosion together with the normal vibration and flexure cause a rapid deterioration of the system. Another consideration is cost. An automobile is sold in an extremely competitive market where a manufacturer's survival may be determined by a few pennies of extra cost, per part. The cost in time and labor for installation or replacement of exhaust system parts can be another and similar limiting factor.

Accordingly, an object of this invention is to provide new and improved conduits.

Another object of this invention is to provide conduits for use in hostile environments where there is a substantial amount of vibration. Still another object of the invention is to provide conduits for use in systems where there are many sources of vibration, such as conduits for use in automotive exhaust systems.

In keeping with an aspect of the invention, these and other objects are accomplished by a convoluted conduit made from single-ply or multi-ply tubing or from a tape wrap, preferably using single or multiple long, ribbon-like, metal strips such as stainless steel, carbon steel, brass, bronze, or any of other suitable alloys. By selecting a proper configuration for the convolutions, the hose may be made self-damping by changing resonant frequencies between convolutions thereby sharply reducing metal fatigue. Depending upon the services to which the conduit may be put, a number of further materials or processing steps may be added.

Several embodiments of the invention for accomplishing these and other objects are shown in the attached drawings in which.

Figure 5:
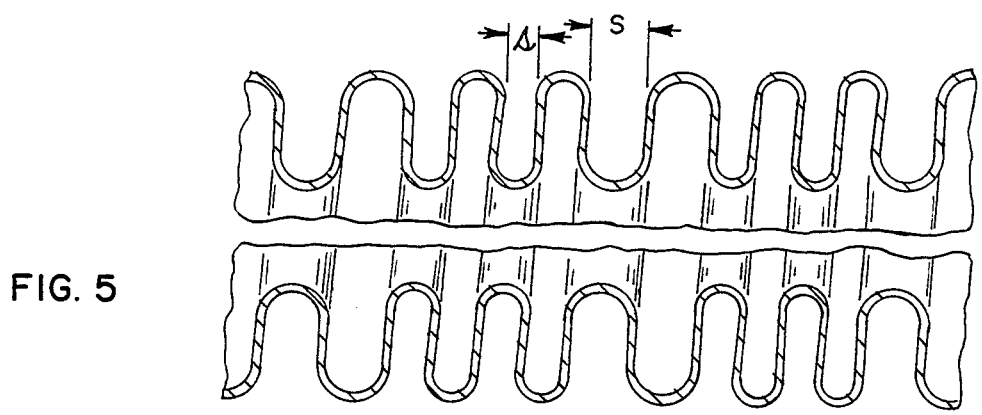
Figure 6:
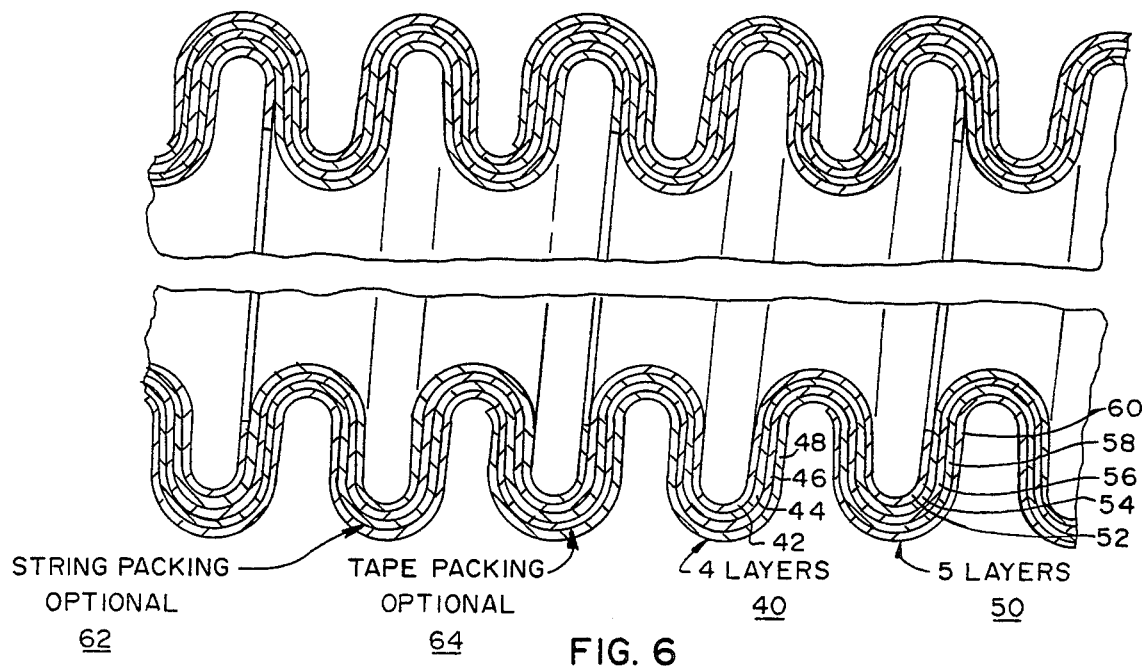

FIG. 5 is a similar cross-section with yet another form of variable annular or helical pitch and with uniform height; and FIG. 6 is a similar cross-section showing a multi-wall wrapped conduit having variable piles and variable wall thickness, the interfaces between separate layers including, by way of example, several forms of metallic and non-metallic gaskets, sealing or bonding between adjacent layers forming the conduit.

Generally speaking, the resonant frequency of a body in a free state varies as the mass and spring rate change within the body. Spring rate for tubular structures varies as the form, wall thickness, and materials change. Mass changes as a result of variations in the type and the volume of material involved.

Due to internal "frictional" forces, all structures are inherently more or less self-damping. When an external vibrating force is cyclically applied at a rate equal to the natural frequency of the structure, it resonates and achieves some maximum displacement at that frequency. To a great extent, that maximum displacement and the rate of vibrational cycling tests the fatigue endurance of the structure. When convoluted conduits are built with indentical convolutions throughout, all convolutions have the same resonant frequency. Each convolution vibrates in phase with every other convolution. Barring external forces, all convolutions give a maximum and equal displacement. However, if convolutions vary significantly, and if spring rates vary between convolutions, all resonant frequencies are not the same and the movement of all convolutions will not be the same. Thus, convolutions and resonance will be prevented from reaching maximum displacement by the adjacent convolutions which are not in resonance.

The invention uses conventional production concepts to manufacture convolute multi-ply conduits or to wrap tape around a form which makes multi-ply helical or annular conduits. For example, BX cable used to provide electrical wiring in home construction has an armor coating which is a convoluted conduit made by wrapping a metal strip or tape around a form. Certain aircraft fuel lines provide examples of a non-metallic convoluted conduit. This type of fuel line is made by wrapping strips of "Teflon", layer on layer, and by wrapping a fiber glass tape on the outside of the resultant structure. Very often operating conditions or design requirements preclude the use of plastics for making a conduit with sufficient flexure and endurance. These and other conduits illustrate tape wrapped conduits similar to that contemplated by the invention.

This invention provides a flexible metal conduit assembly primarily for use with a high temperature transfer of fluid, such as the conduits used in engine exhaust systems or in steam lines that are subject to extreme vibration or flexure. In these and similar installations, there is a substantial movement between the ends of the assembly at both very low and very high frequencies, as a result of mechanical vibrations and of the related resonances. There is also a movement due to thermal expansion and a contraction and due to normal operational displacements of parts. For example, a conduit connecting the engine exhaust manifold to the catalytic converter of an automobile may be exposed to an extreme vibration and intermittent heavy resonance up to frequencies of 500 hertz and sometimes more. There may be offset movements in the order of one inch displacements in three planes due to mechanical vibrations and to expansion caused by exhaust gas at temperatures that may reach 1500° F. and more. Normally, these conduits are very tightly positioned in locations where relatively large hoses, which may be two or more inches in diameter, are restricted to lengths as short as seven or less inches. The fatigue problem is extreme and the restricted spaces demand novel solutions to provide for the endurance and movement which are needed for long term service.

Figure 1:
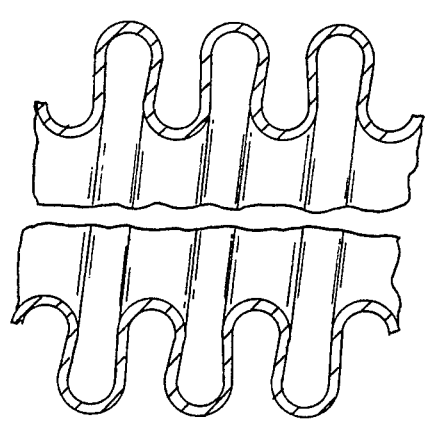
FIG. 1 is a partial cross-section of a conventional, non-self-damping symmetrical convoluted conduit made from a single wall tube with a uniform annular or helical pitch.

For the types of applications described above, the conduit may be made from metallic tubing which is convoluted in a symmetrical and consistent convolution form (FIG. 1) so that flexure stresses are spread uniformly throughout each convolution and over the entire length of conduit. The metal used to make the conduit is selected on a basis of chemical and thermal compatibility for the application. The thickness of the tube depends upon what is needed to resist the pressures anticipated during the intended service.

Figure 2A:
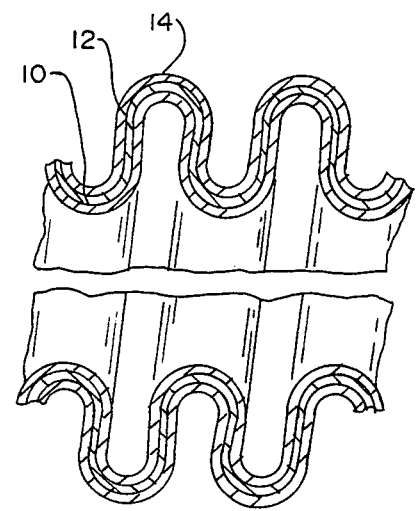
FIG. 2A is a similar cross-section of a conventional multi-wall conduit made from coaxial tubes.
Figure 2B:
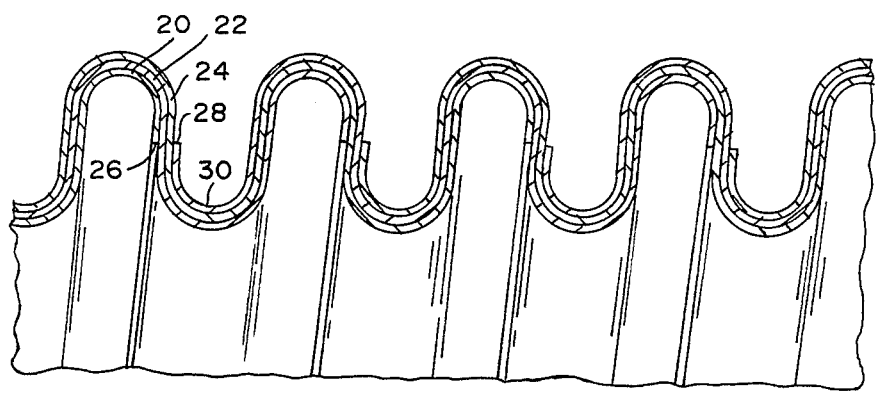
FIG. 2B is a similar cross-section of a conventional multi-wall tape wound conduit with symmetrical convolutions.

When the conduit must be more flexible than the convolutional geometry allows with a single wall thickness, either multiple wall, coaxial tubes or metallic tape wound in multiple layers can be convoluted as shown in FIGS. 2A and 2B, respectively), to reduce the force required to flex the conduit. In both FIG. 2A and FIG. 2B, there is a conventional multi-layer tube having uniform wall thickness. In FIG. 2A, three nesting tubes 10, 12, 14 are coaxially positioned inside each other, and then, all three are convoluted as a unit. In FIG. 2B, three layers of tape 20, 22, 24 are wound one over the other in an alignment which keeps edges 26, 28 of the tape layers opposite each other. Therefore, when the next layer 30 begins, it picks up where layer 20 left off to maintain a uniform thickness. The unit stress on the metal is thus reduced by the multi-layers so that the metal fatigue life is greatly improved. However, a conduit is inherently more expensive when made from either form of multiple wall tubing as compared to single wall tubing. When a multiple wall conduit is used, it has a symmetrical and consistent convolution form.

When the anticipated service includes only a low level vibration and cyclic flexure, the use of the multiple wall conduits together with a symmetric and consistent convolution form is a good solution for endurance against extreme fatigue. However, when severe and variable sinusoidal or random vibration are also involved or when flexure is at very high frequency, the natural frequency and the consequences of resonance must be considered. In this case, the assembly with the multiple wall will have a lower spring rate and thus have an inherently lower natural frequency with a higher amplification factor as compared with a stiffer single wall conduit of the same effective wall thickness and convolution configuration.

Natural vibration frequencies often fall into the normal operating frequency of the equipment, e.g. the normal RPM of an engine causes sympathetic resonant vibrations in the conduit. This operating frequency may cause the conduit to experience resonance under normal operating conditions. Worse still, in these ranges, the natural vibration frequency of the conduit may match the resonant frequency of the engine. The resultant super-imposing of resonance on resonance creates an extreme cyclic load amplification that leads to a fatigue failure in a relatively short time. Hence, prior art devices such as those shown in FIGS. 1 and 2 have required external damping to prevent or inhibit this kind of self-destructive resonance.

Figure 3:
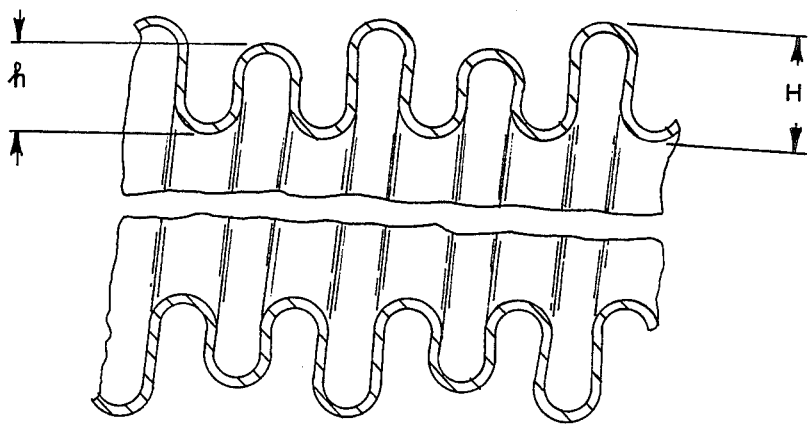
FIG. 3 is a similar cross-section showing the inventive self-damping, non-symmetrical, convoluted conduit made from a single wall tube with a variable height.
Figure 4:
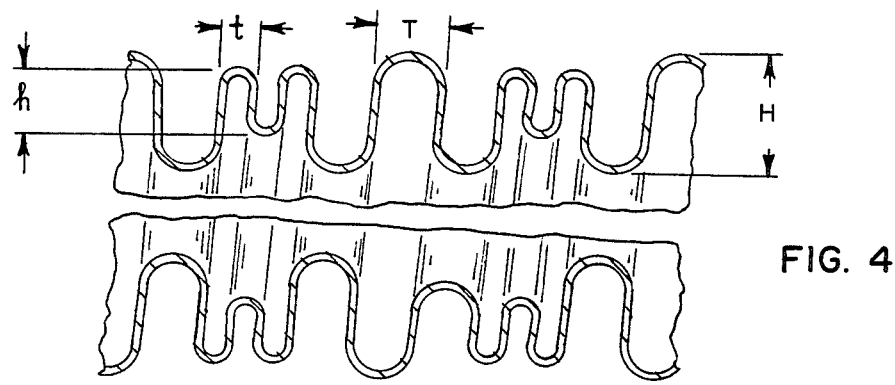
FIG. 4 is a similar cross-section of a conduit with a variable annular or helical pitch and with a variable height.

Every structure that experiences vibration has within itself some inherent self-damping capability. FIGS. 3–5 show three exemplary ways of providing the inventive conduit. This is done by using non-symmetrical convolutions which have a varying convolution form (FIGS. 3, 4) or uniform convolutions with variable spacing (FIGS. 4, 5) along the length of the conduit. The convolutions in FIG. 3 have a variable height, H, h. The convolutions in FIG. 4 have both a variable height, H, h and a variable convolution thickness, T, t. The convolutions in FIG. 5 have a uniform height, but a variable spacing, S, s.

Another economical way to achieve a variation in the spring rate between convolutions is to use a wrapped multi-layer structure (FIG. 6) with the wrapping tape overlapping itself in a non-uniform manner. The overlapping edges of the tape can be made to end on a convolution in a manner that gives a variation in the thickness of layers and, therefore, a variation in the spring rate between convolutions.

By way of example, FIG. 6 shows a design where convolutions have either 4-layers or 5-layers. For example, at 40, there are four layers 42–48 of tape forming the wall of the conduit and, at 50, there are five layers 52–60 forming the wall of the conduit. By an inspection of FIG. 6, it should be apparent that individual convolutions may have a different number of layers, thereby giving the convolutions a thickness which varies as compared to the thicknesses of its neighboring convolutions.

However, alternative arrangements may be used with multi-layer conduits. For example, sometimes one-third of the convolutions may be thicker or thinner than the remaining two-thirds of the convolutions. There may also be a variation in the form between adjacent convolutions to further refine the spring rate and the related natural frequency, as taught by combinations of the principles shown in FIGS. 3–6. Further, changes of form may be achieved by applying disposable layers of filler material of varying thicknesses to the inside surface of the conduit. When this disposable material of variable thickness is removed after the conduit is formed, there is a variation in the form of the conduit.

The multi-layered conduit of FIG. 6 may be made into a sealed and bubble-proof conduit so that there is no passageway for enabling an escape of fluid from the conduit. One way of sealing the multi-layers of the tape is to provide a layer of gasket material on either the inside or the outside of the conduit by laying down a strip of the gasket material as either the first or the last wrap. The gasket material may be either metallic or non-metallic. The appropriateness of this approach depends in part upon the characteristics of the fluid inside the conduit, upon its corrosive effects and impact, and upon how thin the various tapes may be. With these considerations in mind, the tape thickness is selected to avoid creating mechanical problems.

Another approach for sealing the conduit is to provide a relatively soft solder which may be applied in a liquid phase as a wash to coat the inside of the conduit.

Still another way of sealing the conduit is to provide a brazing material between the layers of the multi-layer wrap, as by plating a surface of the primary metal (e.g. stainless steel) tape with a brazing material such as copper. Yet another way is to apply successive wraps of steel tape and copper tape, for example, in alternate layers. The brazing material may cover either the entire surface of the tape or part of the surface of the tape, such as at only the edges of the tape which make the wall of the conduit. The resulting conduit is then placed in a brazing furnace which melts the brazing material and bonds the confronting surfaces of the steel tape, thereby making a unitary conduit wall. When the interface is only partly bonded by brazing, the brazed versus non-brazed area create a variation in plies which cause a substantial change in the stiffness and spring rate between convolutions of the conduit.

Concentric multi-ply tubes with brazing tape wrapped between tube interfaces create a variable ply geometry between convolutions. Wherever the surface between two tubes is brazed, the structure behaves as though the two bonded plies are, in fact, one wall thickness. Thus, bonding changes the thickness considerably.

A string 62 or a tape 64 of gasket or packing material may be interposed between adjacent layers of the metal tape. Since the metal tape is tightly wound into the conduit form, the packing material is compressed between the layers of the tape.

The concept is to make non-symmetrical convolutions that will be self-damping as a result of its unique design. A continuous, helically-wrapped tape is formed with or without metallic or non-metallic tape interlayers to help seal the multi-ply, non-uniform convoluted wall thickness that is self-damping. In many cases, the FIG. 6 method of varying the wall thickness is substantially less expensive than non-symmetrical convoluted multi-ply conduit. In any of its many forms, a principal advantage of the multi-ply conduit is that it may be made with bubble tight seams, even at very high internal pressures.

For exhaust systems which operate at low pressures, when either tape-formed or tube-formed multi-ply non-symmetrical convoluted metal hose do not have to be bubble tight, the use of the non-symmetrical, wrapped form is preferred. In each case, adjacent convolutions are self-damping under resonance conditions. The choice of design depends upon the operating conditions and upon the economics for the application.

Thus, convolutions in FIG. 6 may have a variable wall thickness with and without gaskets. The principles may be used together in any combination to significantly change or control the variations in spring rate along incremental length segments of the conduit. There are variations in the interrelated natural frequencies between convolutions. Therefore, as some convolutions experience an induced resonance, their neighboring convolutions have different natural resonance frequencies which do not synchronize. Hence, the convolutions in the conduit have different resonance frequencies so that the conduit does not go into a natural self-sustaining vibration pattern. In fact, adjacent convolutions of one resonance tend to dampen the vibration of the nearby convolutions of anothe resonance, thus making the entire conduit more self-damping.

The variations in the convolution form are easily visualized and can be accomplished with conventional tooling that forms two or more layers at a time, for making either single or multiple wall tubing. By making simple adjustments on this tooling, the convolution height or shape may be easily changed enough to vary the spring rate between convolutions by at least 10%. This variation will change the natural frequencies sufficiently to provide additional self-damping. The spring rate can be changed substantially more than 10% by the techniques illustrated in FIGS. 3, 4, 5, and 6. The larger variations in spring rate between convolutions become necessary when there are heavy preloads or high operating pressures in the conduit. These high external loads increase the spring rate and resonant frequency of the conduit and reduce the effect of the original free state spring rate variation, which, in turn, reduces the amount of self-damping contained within the conduit. On the other hand, as the spring rate changes more and more between convolutions, the distribution of strain between the convolutions becomes more disproportionate. The ability of the conduit to flex becomes impaired because most of the flexing occurs in those convolutions which have the lowest spring rate. Therefore, care must be taken so that the non-symmetry of convolutions is great enough to assure self-damping under anticipated operating conditions, but also is small enough to maintain the greatest possible uniformity of flexing.

When the convolution form (FIGS. 3, 4, 5, 6) alters the spring rate between convolutions, a use of concentric tubes to achieve multiple layers is practical, although it may be relatively expensive.

Those skilled in the art will readily perceive how to modify the invention without departing from the scope or spirit thereof. Therefore, the appended claims ae to be construed to cover all equivalent structures.

What is claimed:

1. An automotive exhaust system comprising a self-damping conduit made of metal which is capable of resonant vibrations, said conduit being formed of a convoluted tube having successive convolutions with varying physical dimensions which produce different resonant frequencies of vibration in individual incremental lengths of said conduit, and each incremental length of said tube having a reaction to physical vibration which counteracts the reaction of its neighboring incremental length to those same physical vibrations, whereby said conduit is self-damping because it does not have a single high amplitude resonant frequency of vibration throughout its entire length.

2. The conduit of claim 1 wherein said physical dimensions are variations in the heights of said convolutions.

3. The conduit of claim 1 wherein said physical dimensions are variations in the thicknesses of said convolutions.

4. The conduit of claim 1 wherein said physical dimensions are variations in the spacings between convolutions.

5. The conduit of claim 1 wherein said conduit is made of metal tape wrapped to form the walls of a tubular structure.

6. The conduit of claim 5 wherein there are a plurality of layers of said metal tape wrapped over each other to form the walls of a tubular structure.

7. An elongated convoluted metallic conduit for use in a mechanical system which produces characteristic vibrations that are likely to cause metal fatigue, said conduit comprising a self-damping metal tube having convoluted walls with incremental variations in the geometry of successive ones of said convolutions to preclude a self-sustaining uniformity of resonant responses to said characteristic vibrations, said variations in the geometry of said convolutions being distributed throughout the length of said conduit to preclude any overall resonant response in said tube to the operating frequency range of said characteristic vibrations.

8. The conduit of claim 7 wherein said variations are variations in at least one of height, thickness, form, and pitch of successive convolutions.

9. The conduit of claim 1 wherein said variations in said convolutions are large enough to have resonance at different frequencies to assure self-damping between adjacent convolutions and small enough to maintain a maximum uniformity of flexing.

10. An elongated convoluted conduit made of metal which is capable of sustaining a resonant vibration at engine caused frequencies, said conduit being shaped and formed for inclusion in the exhaust system of an automotive vehicle having said engine caused frequencies, the individual convolutions of said conduit having variations of physical characteristics such that the physical characteristics which react to said vibration of each convolution is different from the physical characteristics of at least some of its neighboring convolutions, whereby vibrations in individual convolutions at said engine caused frequencies oppose and damp said vibrations in other of said individual convolutions so that said conduit does not have a uniform resonant response to said engine caused frequencies throughout the length of said conduit.

* * * * *